Jan. 23, 1962
F. BEVILACQUA ET AL
3,018,240
SPRING DRIVEN ACTUATING MECHANISM
FOR NUCLEAR REACTOR CONTROL
Filed Jan. 21, 1958
4 Sheets-Sheet 3
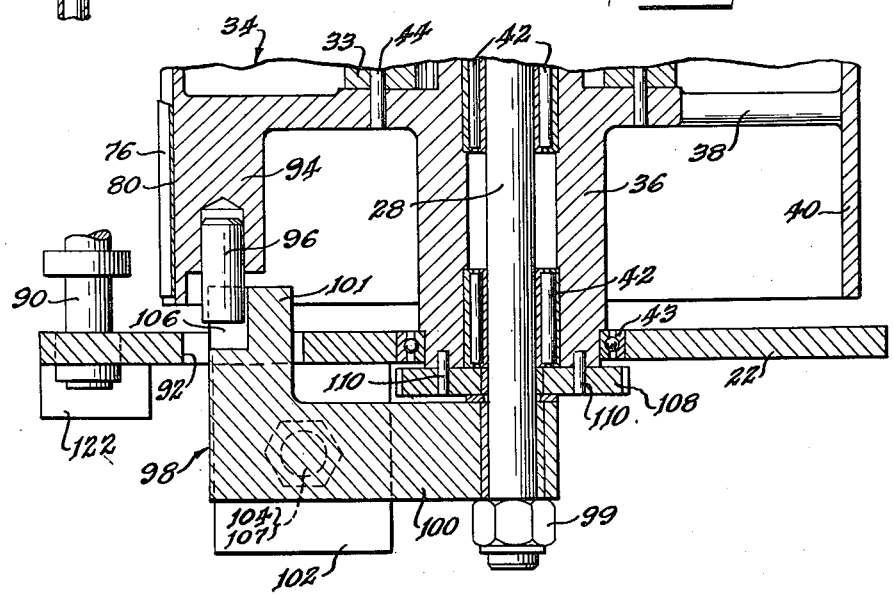
INVENTORS
Frank Bevilacqua
Donald F. Uecker
Edward F. Groh
By
Attorney Jan. 23, 1962 F. BEVILACQUA ET AL 3,018,240
SPRING DRIVEN ACTUATING MECHANISM
FOR NUCLEAR REACTOR CONTROL
Filed Jan. 21, 1958 4 Sheets-Sheet 4
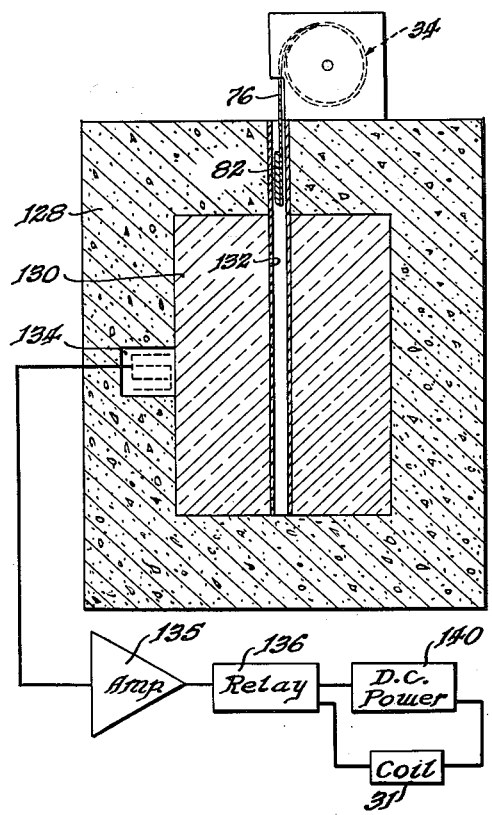
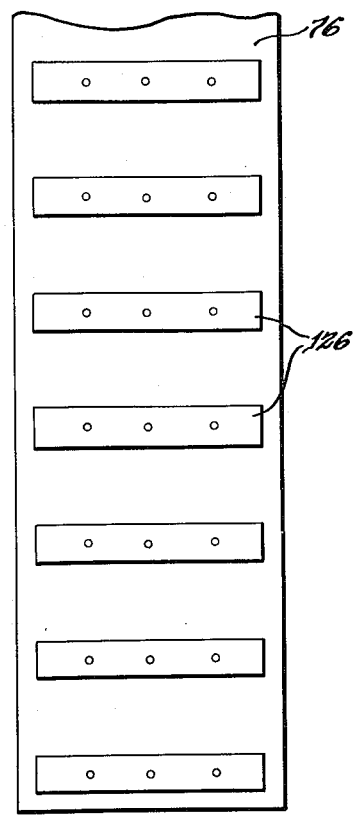
INVENTORS
Frank Bevilacqua
Donald F. Uecker
Edward F. Groh
By
Attorney United States Patent Office 3,018,240
Patented Jan. 23, 1962

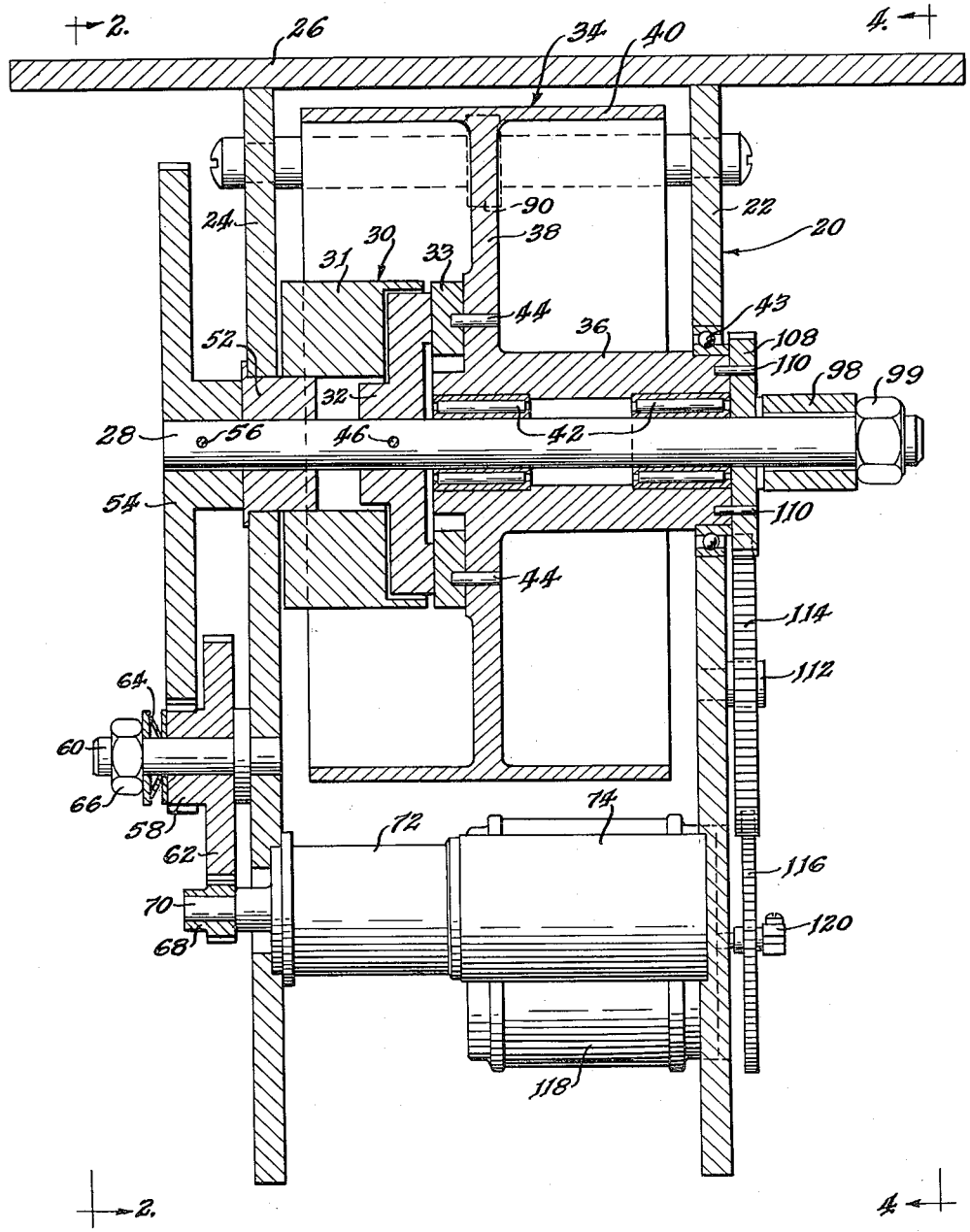

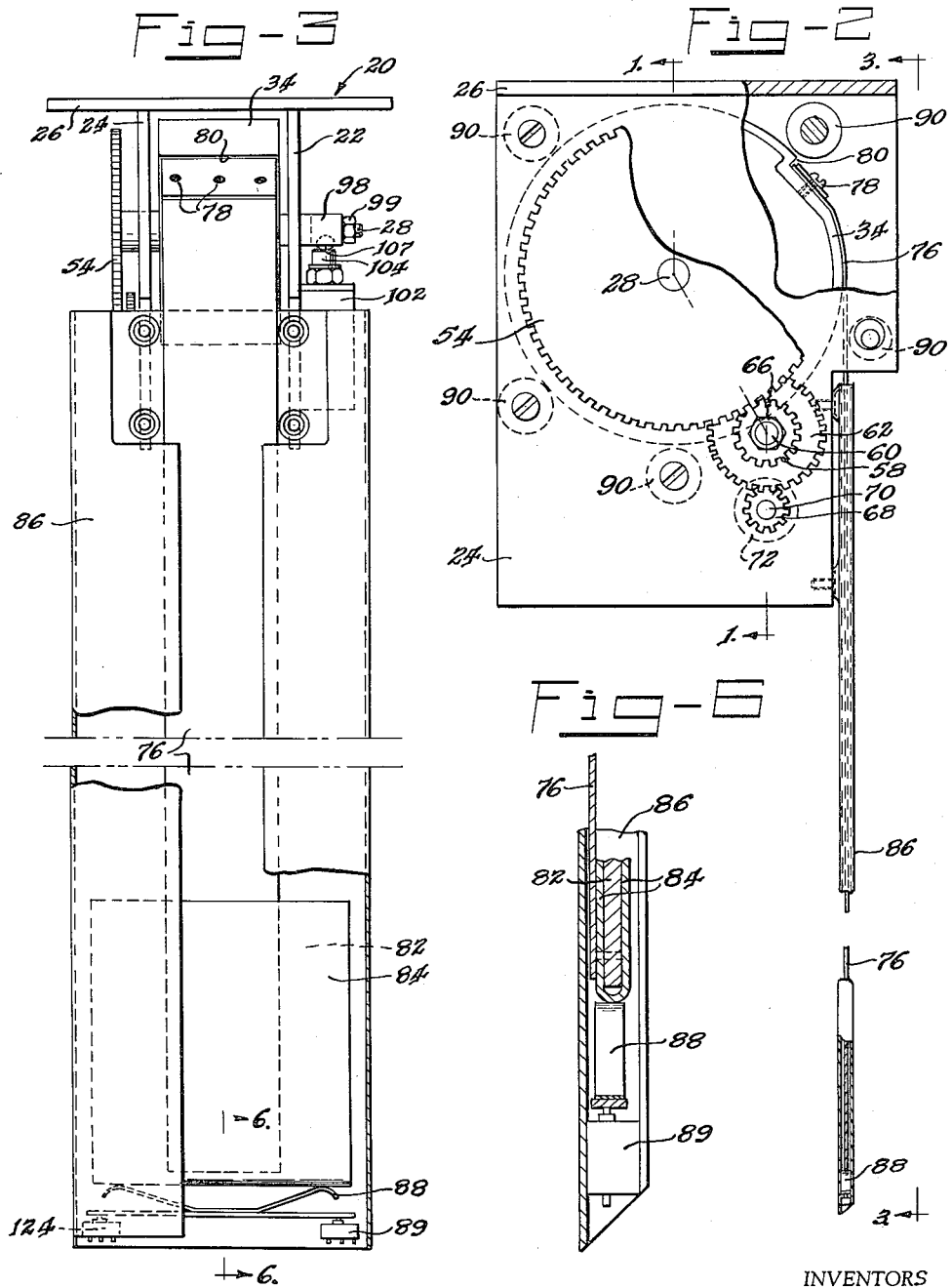

3,018,240
SPRING DRIVEN ACTUATING MECHANISM FOR NUCLEAR REACTOR CONTROL
Frank Bevilacqua, Clearwater, Fla., and Donald F. Uecker, Lisle Township, Du Page County, and Edward F. Groh, Chicago, Ill., assignors to the United States of America as represented by the United States Atomic Energy Commission
Filed Jan. 21, 1958, Ser. No. 710,370
3 Claims. (Cl. 204—193.2)

This invention relates to an actuating mechanism that is driven by energy stored within its component parts and that utilizes the friction between its component parts to withhold release of such energy. More particularly it relates to a control or safety member actuating mechanism for use with a neutronic reactor of the type described by Armstrong and Kelber in an article entitled "Argonaut-Argonne's Reactor for University Training" appearing in the March 1957 issue of Nucleonics, pages 62–65, as well as with other neutronic reactors of the type described by Fermi et al. in U.S. Patent No. 2,708,656, issued on May 17, 1955.

One of the means by which control of the fissioning process in neutronic reactors is achieved is through the absorption of neutrons released therein. Generally a plurality of channels are provided in the core of a reactor; these channels are adapted to receive members of neutron-absorbing material. Such members are moved to positions within the core of the reactor so as to sustain a neutron chain reaction therein at some predetermined power level. The members of neutron-absorbing material, or control members, are generally actuated by electromechanical devices mounted on the reactor and operated remotely therefrom.

Neutronic reactors are also provided with means to suddenly terminate or quench the chain reaction taking place therein. Such means are provided for reasons of safety; for in the event that the ordinary control means fails, it is essential that the chain reaction be prevented from exceeding the physical limitations of the neutronic reactor. One means of suddenly terminating a chain reaction is to insert a member containing material that is highly neutron-absorbent into the core of the neutronic reactor. Such a member is termed a safety member and is inserted and removed from the core of a neutronic reactor by mechanisms similar to those utilized for the movement of control members. It is with such mechanisms that the present invention is concerned.

Control and safety members are generally oriented along vertical axes and positioned to enter a neutronic reactor from above so that in the event of a power failure, the control members will fall vertically downwardly under the force of gravity to rest positions within the reactor core, thereby attenuating and quenching the chain reaction. In order to utilize the force of gravity in this way, i.e., as a safety measure in the event of a power failure, the use of horizontally oriented control and safety members is precluded. However, it is often desirable from a design standpoint to provide horizontally oriented members, or members oriented along axes other than vertical axes, in a neutronic reactor. Herein lies one of the limitations of present control and safety member systems.

Another limitation of present control and safety member systems is the slow manner in which operation occurs after a power failure since the force acting on the members is limited to the force of gravity minus the frictional force between the members and the channels in which they move. In some cases the frictional force on a member may actually exceed the gravitational force acting thereon, thereby preventing the member from falling to a rest position within the reactor core to quench the neutron chain reaction occurring therein.

Still another limitation of present control and safety member systems is the relatively great clearance that must be provided adjacent to the neutronic reactor to accommodate such systems. Since control and safety members may be as long as the height of the reactor itself, the actuating mechanism itself being included, it is often necessary to provide clearance above a reactor equal to the reactor height. Such a requirement essentially doubles the size of the structure that houses the reactor over the size that would be required to house the reactor itself.

One of the objects of the present invention, therefore, is to provide a control or safety member actuating mechanism that will operate in a positive and rapid manner to attenuate a neutron chain reaction occurring within a neutronic reactor in the event of a power failure.

Another object of the present invention is to provide a control or safety member actuating mechanism that accomplishes the above stated object regardless of the orientation of the control or safety members and without dependence on gravitational forces.

A further object of the present invention is to provide a control or safety member actuating mechanism that can be operated over its entire range within a relatively small clearance adjacent to a neutronic reactor with which it is associated.

Still another object of the present invention is to provide a control or safety member actuating mechanism that may be driven by energy stored within its component parts and that utilizes frictional forces between its component parts to withhold release of such energy.

The present invention accomplishes these and other objects by providing an apparatus comprising generally a drum rotatably mountable on a neutronic reactor adjacent to a channel provided therein, an elongated flat spring attached to the surface of the drum, windable thereon, and extensible therefrom into the channel, and a motor for rotating the drum in either direction coupled thereto through a clutch.

The details of construction and operation of the present invention may be best understood by consideration of the following specification and the accompanying drawings, in which:

FIG. 1 is a sectional view of the actuating mechanism of the present invention taken along line 1—1 of FIG. 2;

FIG. 2 is a side view of the actuating mechanism, as viewed from line 2—2 of FIG. 1, showing the gear train through which the apparatus may be driven and showing the channel that receives the control or safety member;

FIG. 3 is an elevational view taken along line 3—3 of FIG. 2 showing the spring of the actuating mechanism, with the control or safety member attached thereto, fully inserted in the channel;

FIG. 4 is another side view of the actuating mechanism, as viewed from line 4—4 of FIG. 1, showing the gear train through which the position of the control or safety member in the channel may be recorded and showing the means for braking the actuating mechanism;

FIG. 5 is a partial sectional view taken along line 5—5 of FIG. 4 showing the relationship of the braking elements as they engage to brake the actuating mechanism;

FIG. 6 is a sectional view taken along line 6—6 of FIG. 3 showing a portion of the control or safety member in engagement with the end of the channel that is remote from the actuating mechanism.

FIG. 7 is a partial view of an alternate safety or control member; and

FIG. 8 is a view, partially in section, of a neutronic reactor with the actuating mechanism mounted thereon and showing means for automatic operation.

As shown in FIG. 1, the actuating mechanism of the present invention comprises a frame 20 having a right side plate 22, a left side plate 24, and a top plate 26 that connects the right and left side plates at their upper edges. The right side plate 22 and the left side plate 24 carry a drive shaft 28 at their central portions, the drive shaft passing through the side plates to extend therebetween and laterally outwardly therefrom. A magnetic clutch 30, comprising a coil 31, an annular disk 32, and an annular plate 33, is located inwardly from the left side wall 24 and adjacent thereto, the shaft 28 passing through the coil, the disk, and the plate. An open end drum 34, comprising a hub 36, a spider 38, and a cylinder 40, is rotatably mounted on the shaft 28 through needle bearings 42, the drum being disposed between the right side plate 22 and the left side plate 24. Magnetic clutch 30 is partially enclosed by the open end of the drum 34 that faces the left side plate 24, the hub 36 being shorter than the cylinder 40 to accommodate the magnetic clutch 30. Drum 34 is constrained from moving axially on shaft 28 by virtue of hub 36 which is journalled in a hole in the right side plate 22 through a ball bearing 43 at one end and which is obstructed at its opposite end by the magnetic clutch 30. Plate 33 is tied to the spider 38 of the drum 34 by pins 44 to rotate therewith but the plate is physically separated from the shaft 28. Disk 32 is positioned adjacent to plate 33 in slidable contact therewith, the disk being made to rotate with shaft 28 by virtue of a pin 46 that locks the disk to the shaft. Coil 31 closely surrounds a portion of the disk 32 but is physically separated therefrom, the coil being mounted on the inner wall of the left side plate 24. Such an arrangement permits the shaft 28 and disk 32 to rotate while the coil 31 remains stationary. When the coil 31 is energized, the disk 32 and plate 33 will be magnetized and thereby locked together magnetically; therefore with the coil energized, shaft 28, disk 32, plate 33, and drum 34 are made to rotate together. When coil 31 is not energized, however, the plate 33 and drum 34 are free to rotate independently of shaft 28 and disk 32.

The drive shaft 28 is journalled at one end in a bushing 52 press fited into a hole in the left side plate 24. Outwardly from the left side plate 24 and proximal to the bushing 52, a speed reduction gear 54, best seen in FIGS. 1 and 2, is mounted on the drive shaft 28 and made to rotate therewith by virtue of a pin 56. The speed reduction gear 54 engages a small gear 58 rotatably mounted therebelow on a post 60 projecting outwardly from and press fitted into a hole in the left side plate 24. Gear 58 is tied to a larger gear 62 rotatably mounted side-by-side therewith on post 60 between gear 58 and left side plate 24. A spring washer 64 acts between a nut 66 on the end of post 60 and gears 58 and 62, the nut rotatably retaining the gears and washer on the post. The larger gear 62 engages a small drive gear 68 mounted therebelow on a shaft 70. The shaft 70 passes through a hole in the left side plate 24 to a gear reducer 72 which is driven by an electric motor 74 connected thereto and mounted on the inner wall of the right side plate 22. When the motor 74 is energized, the gear reduced 72 turns shaft 70 and through gears 68, 62, 58, and 54, the drive shaft 28 is rotated. As previously explained rotation of the drive shaft 28 causes the drum 34 to turn by virtue of the magnetic clutch 30 when coil 31 is energized.

As shown in FIGS. 2 and 3, a flat elongated spring 76 whose width is about equal to that of the drum 34 is attached at one end by screws 78 to the drum in a depression 80 formed in the surface thereof. The line of attachment of spring 76 on the surface of drum 34 is parallel to the axis of shaft 28 so that when the drum is rotated, the spring is windable thereon. As may be seen in FIG. 6, the end of the spring 76 free from the drum 34 has attached thereto a plate 82 of neutron-absorbing material sheathed by a casing 84. Mounted on the frame 20 and extending therefrom, as may be seen in FIGS. 2 and 3, is a thin elongated tube or channel 86 adapted to receive and guide the spring 76 and plate 82 as the spring is unwound from the drum 34. In practice the channel 86 would be located within the core of a neutronic reactor to which the present invention was applied. At the end of the channel 86 that is remote from the drum 34 is a spring having the form of a cradle 88 that acts as a shock absorber for the plate 82 when the spring 76 is suddenly unwound from the drum 34 causing the plate to rapidly accelerate toward the remote end of the channel. A microswitch 89 located below the cradle 88 in the remote end of the channel 86 is connected to an indicating light, not shown, the microswitch being operated by the cradle when the plate 82 presses thereon to indicate that the plate is positioned at the remote end of the channel.

As seen in FIGS. 1, 2, and 4, a plurality of rollers 90 are mounted between right side plate 22 and left side plate 24 with their axes parallel to the axis of shaft 28. Rollers 90 are arranged in a generally radial pattern about the axis of rotation of drum 34 and are spaced a small distance from the surface thereof to provide clearance for the spring 76 to be wound on the drum. Spring 76 is confined to lie against the surface of drum 34 by rollers 90 and is guided into channel 86 thereby when unwinding from the drum. Channel 86 and rollers 90 cooperate to cause rotation of the drum 34 when the spring 76 unwinds therefrom; were it not for the channel and rollers, the spring in unwinding would leave the drum without causing rotation thereof. The roller 90 that is located nearest the entrance of spring 76 to channel 86 is eccentrically mounted so that its bearing force against the spring may be adjusted.

As seen in FIG. 4, there is an elongated arcuate slot 92 formed in the right side plate 22 and in registry with a portion of the open end of the drum 34 that faces the right side plate. Slot 92 lies along a 90° arc of a circle having its center at the axis of the shaft 28 and having a radius about equal to that of the drum 34. As shown in FIG. 5, the cylinder 40 of drum 34 has a boss 94 formed on its inside wall; a post 96 is press fitted into the boss and extends laterally outwardly therefrom toward the right side plate 22. Boss 94 and post 96 are located on drum 34 adjacent to and in registry with slot 92 when the drum is in the position shown in FIGS. 4 and 5. An L-shaped arm 98 is rotatably mounted outwardly of the right side plate 22 on the end of shaft 28 and retained thereon by a nut 99. L-shaped arm 98 has a trunk 100 that extends transversely from the shaft 28 and a branch 101 that passes through the arcuate slot 92 thus confining the arm to movement within the slot. Mounted on the right side plate 22 below the arcuate slot 92 and the L-shaped arm 98 is a dashpot 102 having a piston stem 104 extending upwardly therefrom. Dashpot 102 is a conventional type containing a viscous fluid, a perforated piston, and a spring, and will not be described here in detail. The dashpot 102 acts as a brake and shock absorber for the actuating mechanism when spring 76 is permitted to suddenly unwind from drum 34 causing rapid acceleration of the moving parts of the mechanism as the plate 82 is driven toward the remote end of the channel 86. When spring 76 is almost fully unwound from drum 34 and plate 82 approaches the remote end of channel 86, post 96 is in the position shown in FIG. 4, i.e., in engagement with arm 98. Reference to FIG. 5 clearly shows post 96 overlapping arm 98 when spring 76 approaches being fully unwound from drum 34. Drum 34 in rotating carries post 96 into a niche 106 in arm 98 and drives the arm downwardly against upwardly extending piston stem 104 through a ball 107 embedded in the arm. Piston stem 104 moves downwardly into dashpot 102 under this force, thereby dissipating the kinetic energy of the moving parts of the actuating mechanism, principally as heat. The kinetic energy of the moving parts is of course obtained, by conversion, from the potential energy of the spring 76 in its wound state, the conversion being brought about by permitting the wound spring to pass to a state of less energy, i.e., to unwind.

As best seen in FIGS. 1 and 4, an upper gear 108 is rotatably mounted on shaft 28 between right side plate 22 and arm 98. Gear 108 is tied by pins 110 to hub 36 of drum 34 to rotate therewith. In engagement with upper gear 108 and rotatably mounted therebelow on a post 112 that is press fitted into a hole in right side plate 22 is an intermediate gear 114. Gear 114 engages a lower gear 116 mounted therebelow on the shaft of a position indicator 118 which is the sender of a selsyn system. Since selsyn systems are available commercially and their operating principles are well known, no details concerning them will be given here. Gear 116 is fastened to the shaft of position indicator 118 to cause rotation thereof and is retained on the shaft by a clamp 120. The receiver of the selsyn system, now shown in the drawings, is connected to the sender and is mounted remotely therefrom for observation of the position of plate 82 within channel 86. As drum 34 rotates to move plate 82 within channel 86, upper gear 108 turns lower gear 116 through intermediate gear 114 and the lower gear rotates the shaft of the position indicator 118. Since the shaft of the position indicator 118 must translate all positions of the plate 82 in one revolution due to the inherent principles of a selsyn system, lower gear 116 may pass through only one revolution while the plate moves the full length of channel 86. In the particular embodiment described and illustrated here, this is accomplished by making the gear ratio of upper gear 108 to lower gear 116 equal to 1.25:1.00. The reason for this ratio becomes apparent when consideration is made of the operation of the actuating mechanism. If plate 82 is at the remote end of channel 86, as shown in FIG. 3, L-shaped arm 98 is disposed immediately above dashpot 102 and piston stem 104 is fully inserted in the dashpot. Further, post 96 in boss 94 on drum 34 is engaged with niche 106 in arm 98 at the lower end of the slot 92. As drum 34 is turned to wind spring 76 thereon, post 96 leaves niche 106 and proceeds with the drum in a clockwise direction as viewed in FIG. 4 until one revolution has been completed, when post 96 will engage the face of arm 98 opposite niche 106. As drum 34 continues to rotate, post 96 will carry arm 98 through slot 92 for another one-quarter of a revolution at which time branch 101 of the arm which passes through the slot will engage the upper end of the slot and prevent the drum from further rotation. It is seen therefore that drum 34 is confined to rotate through 1.25 revolutions as is upper gear 108 which is tied thereto. Since plate 82 must move the full length of channel 86 while drum 34 is making 1.25 revolutions, spring 76, excluding the portions that are attached to the drum and the plate, is made to have a length equal to 1.25 times the circumference of the drum. Likewise, the shaft of position indicator 118 in order to experience one revolution while drum 34 is rotating through 1.25 revolutions, requires that the gear ratio of upper gear 108 to lower gear 116 be 1.25:1.00, as previously stated.

Although some suggestion of the operation of the present invention has already been made, a complete explanation will now be presented. The operation of the actuation mechanism as a safety device will be considered first, followed by consideration of the actuating mechanism as a control device.

When the apparatus is to be utilized as a device for actuating a safety member in conjunction with a neutronic reactor, initially spring 76 is fully wound on drum 34, plate 82, which is made of neutron-absorbing material, is disposed at the end of channel 86 that is adjacent to the drum, post 96 is in engagement with the face of arm 98 that is opposite niche 106, the arm is in engagement with the end of slot 92 that is remote from dashpot 102, and coil 31 is energized to magnetically lock disk 32 and plate 33 together. This state will maintain as long as coil 31 is energized due to frictional forces in shaft 28, bushing 52, gears 54, 58, 62, and 68, reducer 72, and motor 74. Potential energy stored in spring 76 in its wound state generates a restoring force directed to unwind the spring from drum 34 in opposition to these frictional forces, but the restoring force is insufficient to overcome them. To fully insert plate 82 within a neutronic reactor, commonly referred to as "scramming the reactor," coil 31 is deenergized, thereby breaking the lock between disk 32 and plate 33 and rendering ineffective the restraint of the frictional forces on the restoring force of spring 76. The restoring force of spring 76, practically unopposed with coil 31 deenergized, will unwind the spring from drum 34 and, due to the confinement of the spring within rollers 90, will thrust the spring and plate 82 into channel 86 and cause the drum to rotate. Spring 76, plate 82, and drum 34 will accelerate until post 96, arm 98, and dashpot 102 engage to decelerate and stop the spring, plate, and drum as the plate approaches the remote end of channel 86. The location of plate 82 at this end of channel 86 will cause a sudden decrease, due to absorption, in the number of neutrons available for participation in the fission process within the neutronic reactor, thereby quenching the chain reaction. To remove plate 82 from its operative position at the remote end of channel 86, coil 31 is energized to lock disk 32 and plate 33 together. Motor 74 is then energized to rotate drum 34, thereby winding spring 76 there on, through gear reducer 72, gears 68, 62, and 58, shaft 28, and magnetic clutch 30. As drum 34 rotates to wind spring 76 thereon, plate 82 which is wider than spring 76 approaches the end of channel 86 that is adjacent to the drum. As plate 82 exits from channel 86 the plate actuates a microswitch 122, shown in FIGS. 4 and 5, which is mounted on right side plate 22 at the end of the channel that is adjacent to drum 34. Actuation of microswitch 122 by plate 82 deenergizes motor 74 thereby terminating the driving force on drum 34. Since coil 31 remains energized, spring 76 will remain wound on drum 34, as explained previously, with plate 82 withdrawn to the end of channel 86 that is adjacent to the drum.

Operation of the present invention as a device for actuating a control member in conjunction with a neutronic reactor is somewhat different from operation as a device for actuating a safety member. Since plate 82 to operate as a control member must be moved to and fro in channel 86 smoothly and in a manner that permits positioning of the plate at any location within the channel, the sudden thrusting of the member into the channel by the unregulated unwinding of spring 76 is not permissible. Consider initially spring 76 to be fully wound on drum 34 with coil 31 energized to prevent unwinding of the spring due to frictional forces greater than and acting in opposition to the restoring force of the spring. To unwind spring 76 from drum 34, thereby moving plate 82 in channel 86 away from the drum, the rotation of motor 74 is reversed with coil 31 remaining energized so that shaft 28 will drive the drum to unwind the spring therefrom. When plate 82 has been moved to the desired location within channel 86, motor 74 is deenergized with coil 31 remaining energized. Frictional forces will prevent the restoring force of the spring 76 from moving the plate 82 away from the desired location until motor 74 is again energized to overcome the frictional forces. Similarly plate 82 may be moved in channel 86 toward drum 34 by reversing the rotation of motor 74 so that shaft 28 will drive the drum to wind spring 76 thereon. Again motor 74 is deenergized with coil 31 remaining energized when plate 82 has been moved to the desired location within channel 86, frictional forces preventing the restoring force of spring 76 from rotating drum 34 and shifting the plate from the desired location. Thus it is seen that when the present invention is utilized to actuate a control member, coil 31 remains energized at all times to lock disk 32 and plate 33 together. Also, the motor 74 is employed both to wind and unwind spring 76 from drum 34, this being accomplished by reversing the rotation of the motor. The rotation of motor 74 may be reversed electrically by switching, or mechanically. A microswitch 124, located in channel 86 at the remote end thereof, is actuated by cradle 88 to deenergize the motor 74 when plate 82 is moving away from the drum engages and presses the cradle against the microswitch, thereby preventing the motor from operating to exceed the physical limitations of the elements. Post 96, arm 98, and dashpot 102 may be omitted when plate 82 is to serve as a control member, since the shock absorbing and decelerating functions which they perform when the plate is thrust into channel 86 as a safety member need not be performed when the plate is utilized for control purposes.

In the construction of the actuating mechanism of the present invention, great flexibility is permitted to the artisan in selecting suitable materials and components. Frame 20, shaft 28, arm 98, and the gears of the mechanism may be made of steel or some other structural metal. For drum 34 magnesium or some other light metal may be used to encourage rapid operation when plate 82 is to be used as a safety member. Spring 76 should have a sufficiently high spring constant to insure that the spring will rapidly unwind from drum 34 when coil 31 is deenergized; on the other hand the restoring force of the spring when wound on the drum must be insufficient to overcome opposing frictional forces when the coil is energized to prevent the spring from unwinding. Magnetic clutch 30, comprising coil 31, disk 32, and plate 33, is a conventional apparatus, many different types of various applications being commercially available. Motor 74 is preferably one whose r.p.m. rating is low since the drum 34 to wind spring 76 thereon need experience only a low number of revolution, 1.25 revolutions in the specific embodiment described and illustrated here. Gear reducer 72, which steps down the angular velocity of drive gear 68 from that of motor 74, is a conventional device and is selected from considerations of the angular velocity of the motor, the gear ratio of gear 54 to gear 68, and the desired angular velocity of drum 34.

For maximum sensitivity in utilizing the present invention to actuate a control member, the angular velocity of drum 34 should be made low; however, the diameter of the drum must be considered as well as its angular velocity since both factors affect the linear velocity of plate 82 in channel 86.

When utilizing the present invention to actuate a safety member, gears 108, 114, and 116, and position indicator 118 may be omitted since plate 82 will either be fully inserted in channel 86 or fully removed therefrom, there being no intermediate positions of the plate to be observed on the position indicator. When plate 82 is at the remote end of channel 86, of course, microswitch 89 will be actuated to energize an indicating light, as previously mentioned.

Although plate 82, which contains neutron-absorbing material such as cadmium or boron, is illustrated in FIG. 3 as a single element attached to the spring 76 at the remote end thereof, a plurality of thin narrow strips or cleats 126 of neutron-absorbing material may be distributed along the full length of the spring and attached thereto to resemble rungs on a ladder, as shown in FIG. 7. Such an arrangement provides increased sensitivity of control and is preferable to the single absorber element illustrated in FIG. 3 when the actuating mechanism of the present invention is employed for control purposes.

Preferably cleats 126 are thin and narrow so as not to impede the winding and unwinding of spring 76 from drum 34. To secure cleats 126 to spring 76, rivets may be employed or the cleats may be spot welded to the spring.

In some applications of the present invention it may be desirable to omit both plate 82 and cleats 126. For example, when very fine variations in neutron absorption are to be achieved, spring 76 itself can be made to provide the desired control. Varying the neutron absorption in a neutronic reactor in such a manner is commonly referred to as "shimming the reactor." This is possible by using spring 76 without plate 82 or cleats 126 owing to the fact that the material in the spring, which may be steel, is neutron-absorbent to some extent.

The present invention may be applied to a neutronic reactor, such as a reactor of the type described by Armstrong and Kelber in the previously mentioned Nucleonics article, to operate in a completely automatic manner. As shown schematically in FIG. 8, the actuating mechanism is mounted on a neutronic reactor 128 having a core 130 and a well 132 passing therethrough. Located adjacent to core 130 is a neutron detector 134, such as an ionization chamber, which has an electrical output proportional to the neutron density in the core. The electrical output of neutron detector 134 drives an amplifier 135 whose output is applied to a relay 136 which has normally closed contacts that are connected in series with coil 31 of magnetic clutch 30 and a D.C. power supply 140. With the arrangement shown in FIG. 8 the actuating mechanism of the present invention can be utilized to automatically insert a safety member into the core 130 when the neutron density therein exceeds a predetermined safe level. For as the neutron density in core 130 rises, the output of the detector 134 also rises, as does the output of amplifier 135 and the current in relay 136. When the current in relay 136 reaches a predetermined level the relay will operate and its normally closed contacts will open. The opening of the contacts of relay 136 deenergizes coil 31 of clutch 30 thereby permitting spring 76 to unwind from drum 34 to drive plate 82 through well 132 into core 130 thereby quenching the chain reaction occurring in reactor 128. The operation of relay 136 is, of course, made to occur when the maximum tolerable safe neutron density in reactor 128 is reached by proper selection and setting of relay 136 and by adjusting the gain of amplifier 135. Although only one neutron detector 134 is shown in FIG. 8, in practice several such detectors would be positioned at different points adjacent to core 130. Their outputs would be fed into an integrator whose output would then be used to drive amplifier 135 and relay 136 in the manner previously described. Similarly relay 136 is illustrated in FIG. 8 and has been described as controlling only one neutron-absorbing member. However relay 136 may be used to insert a plurality of neutron-absorbing members into a neutronic reactor with equal facility.

Modifications of the specific embodiments of the present invention that have been described and illustrated here will no doubt occur to those skilled in the art without departing from the spirit of the invention. It is intended therefore to limit the invention only by the scope of the appended claims.

What is claimed is:

1. An assembly comprising a nuclear reactor, a straight channel extending thereinto, a rotatable drum positioned adjacent an end of the channel, a neutron absorber, a spring strip carrying the neutron absorber and having a free end extending into the channel, means attaching the other end of this spring strip to the drum, means for rotating the drum in one direction to wind the spring strip on the drum and to withdraw it from the channel, and anti-friction means close to and spaced about the drum, and means for releasing the drum to make it and the attached end of the spring strip freely rotatable in the opposite direction and thus to enable the straightening tendency of the spring strip under the confining influence of the anti-friction means to project the spring strip into the channel.

2. The assembly specified in claim 1, the neutron absorber being attached to the free end of the spring strip.

3. The assembly specified in claim 1, the neutron absorber taking the form of cleats attached to the spring strip and extending thereacross and being spaced from one another lengthwise of the spring strip.

References Cited in the file of this patent

UNITED STATES PATENTS

| | | |
|---|---|---|
| 1,964,057 | Hill | June 26, 1934 |
| 2,781,308 | Creutz et al. | Feb. 12, 1957 |
| 2,820,753 | Miller et al. | Jan. 21, 1958 |
| 2,893,656 | Carlson | July 7, 1959 |
| 2,936,277 | MacNeill et al. | May 10, 1960 |

OTHER REFERENCES

Proc. Dust. Elect. Engrs. (London), volume 100 (part 1, No. 123), May 1953, pages 97–98. (Copy in Scientific Library (TK 1 I4) and 204–193.3.)

Nucleonics, vol. 13 (June 1955), pages 48, 49.

DP–100, U.S.A.E.C. report dated 1954, declassified February 14, 1956, pages 6, 13, 15, 16.